J. K. Park,
Fruit Basket,
N° 28,105. Patented May 1, 1860.
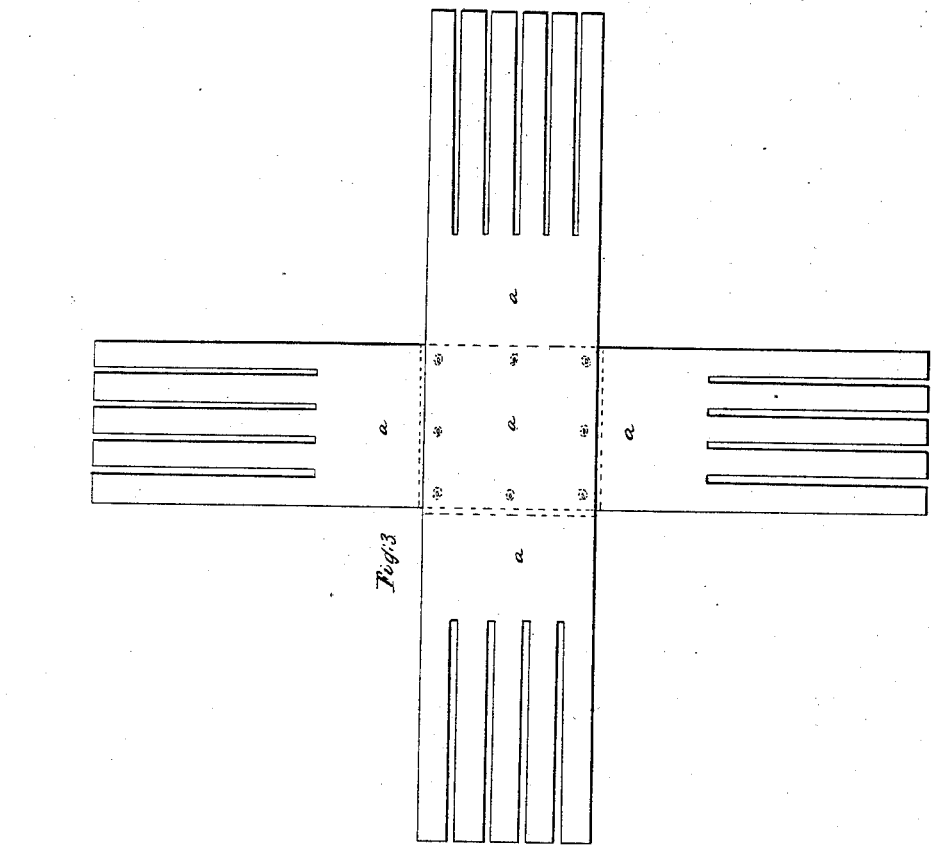
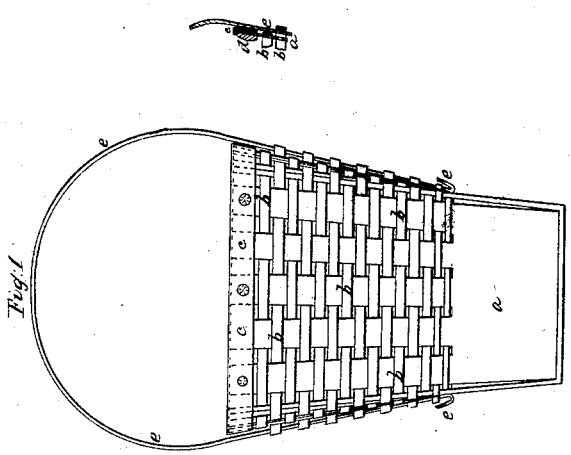
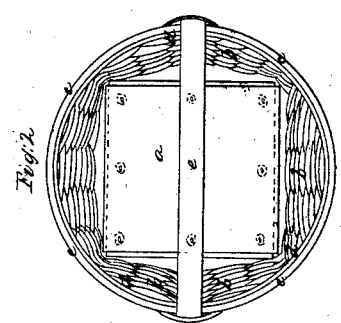
Witnesses
Lemuel W. Serrell
Chas. H. Smith
Inventor
Jesse K. Park

UNITED STATES PATENT OFFICE.

JESSE K. PARK, OF MARLBOROUGH, NEW YORK.

BASKET.

Specification forming part of Letters Patent No. 28,105, dated May 1, 1860.

*To all whom it may concern:*

Be it known that I, JESSE K. PARK, of Marlborough, in the county of Ulster and State of New York, have invented, made, and applied to use a certain new and useful Improvement in Baskets; and I do hereby declare that the following is a full, clear, and exact description of the nature and mode of constructing said basket, reference being had to the annexed drawings, making part of this specification, wherein—

Figure 1 is a side elevation of said basket. Fig. 2 is a plan of the same, and Fig. 3 is a plan of the splints before forming into a basket.

Similar marks of reference denote the same parts.

The nature of my said invention consists in forming the splints for said basket by flat plates or laminæ of wood or suitable material that is divided or formed into strips at the end portions, while the center parts are left solid, and, crossing each other, form the bottom of the basket, and the sides being turned up are interlaced with the filling. The edge of the basket is retained by a metal and wood rim combined, and my handle is fitted to slide up and down, to take less room in packing several baskets together.

My invention is primarily intended for small baskets for transporting berries of all kinds to market, and is much stronger, lighter, more durable, easier packed, and preserves the berries better than any other basket, because the bottom on which the weight of berries rests is smooth, hence less liable to puncture and injure such berries. Beside this, the benefits resulting from the circulation of air through the berries is retained and the difficulty resulting from heating, that often occurs in close boxes, is prevented.

In the drawings, $a\ a$ are thin laminæ of elm or other suitable material laid across each other, as seen in Fig. 3, and attached together. The ends of these pieces are slit up, so as to form splints, and the pieces $a$ are turned up at right angles to the bottom to form the sides, and the filling $b$ interlaced between such splints until the whole size of the basket is formed. I then apply the flanged metal rim $c$ around outside the ends of said splints, and a wood rim, $d$, inserted inside the basket, receives the ends of small tacks, driven from the outside, that unite the rims to each other and to the splints. The filling $b$, commencing some little distance up from the bottom, allows of the introduction of my sliding handle $e$, that passes loosely through the filling, and is turned up at the lower ends, so that the same take the filling when the handle is drawn up and prevent said handle pulling out; but when pressed upon said handle slides down until the ends are to the bottom of the basket. By this means the handles are often protected from injury, as well as being capable of packing into a smaller compass for transportation.

I do not claim laminæ of wood for baskets or boxes; neither do I claim forming openings in the same for ventilating the berries or fruit; neither do I claim a double rim or a metal rim folded double. My rim, however, combines the stiffness of metal with the smoothness of wood, to prevent injury to the fruit.

I am not aware of any previous instance in which two laminæ of wood slit toward each end and laid across each other at right angles have been united into a basket by the filling, as shown; therefore

What I claim, and desire to secure by Letters Patent, is—

1. Constructing baskets by two laminæ of wood slit toward their ends and laid across each other and interlaced with filling, so as to form a square box shape at the bottom and a round basket shape near the top, as set forth.

2. In combination therewith, the metal and wood rim constructed as shown, with the wood rim in the inside, so as not to cut or injure the berries, as set forth.

In witness whereof I have hereunto set my signature this 14th day of March, 1860.

JESSE K. PARK.

Witnesses:
 LEMUEL W. SERRELL,
 CHAS. H. SMITH.